(12) United States Patent
Lee

(10) Patent No.: US 6,515,707 B1
(45) Date of Patent: Feb. 4, 2003

(54) IMAGE FRAME SYNCHRONIZING APPARATUS AND METHOD THEREOF

(75) Inventor: Jae Sun Lee, Pyungtaek (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 09/233,172

(22) Filed: Jan. 19, 1999

(30) Foreign Application Priority Data

Jan. 17, 1998 (KR) .............................................. 98-1305

(51) Int. Cl.[7] .......................... H04N 9/475; H04N 5/268
(52) U.S. Cl. ..................... 348/513; 348/705; 348/584; 348/588; 348/555; 348/715
(58) Field of Search ................................ 348/705, 153, 348/159, 588, 584, 714, 715, 716, 722, 513, 555, 383; H04N 9/475, 5/268

(56) References Cited

U.S. PATENT DOCUMENTS

| | | | | |
|---|---|---|---|---|
| 5,267,039 A | * | 11/1993 | Elberbaum | 348/476 |
| 5,550,594 A | * | 8/1996 | Cooper et al. | 348/513 |
| 5,652,822 A | * | 7/1997 | Sugawara et al. | 386/46 |
| 5,870,139 A | * | 2/1999 | Cooper et al. | 348/159 |
| 5,898,463 A | * | 4/1999 | Nishiyama | 348/554 |
| 5,946,049 A | * | 8/1999 | Cooper et al. | 348/513 |
| 5,990,974 A | * | 11/1999 | Amino et al. | 348/588 |
| 6,075,567 A | * | 6/2000 | Ohnishi | 348/383 |
| 6,118,496 A | * | 9/2000 | Ho | 348/706 |
| 6,172,710 B1 | * | 1/2001 | Yoshida | 348/478 |
| 6,201,580 B1 | * | 3/2001 | Voltz et al. | 348/584 |
| 6,249,324 B1 | * | 6/2001 | Sato et al. | 348/705 |

* cited by examiner

Primary Examiner—John Miller
Assistant Examiner—Jean W. Desir
(74) Attorney, Agent, or Firm—Birch, Stewart, Kolasch & Birch, LLP

(57) ABSTRACT

An image frame synchronizing apparatus and a method thereof which receive image signals from a plurality of image signal sources, detect a synchronous signal from the image signal of one image signal source among the plurality of image signal sources, and synchronize the image frames of image signals from the image signal sources according to the frame synchronous signal, in order to display the images in one frame unit.

8 Claims, 4 Drawing Sheets

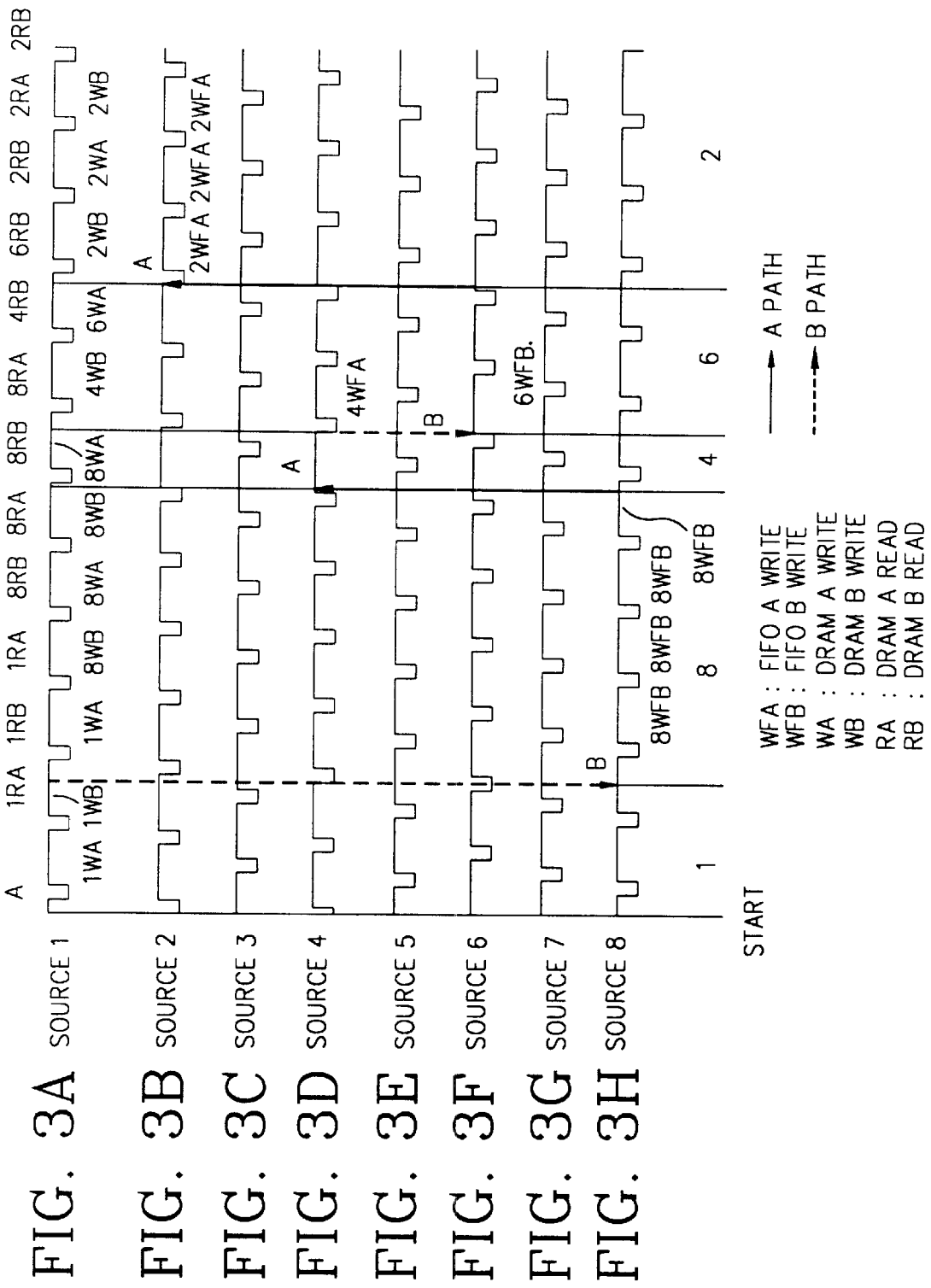

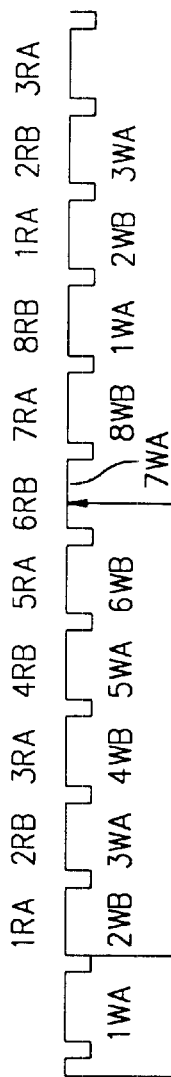
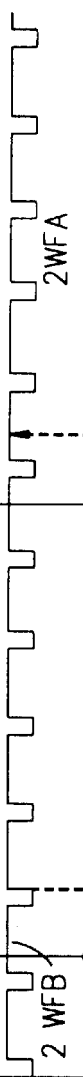
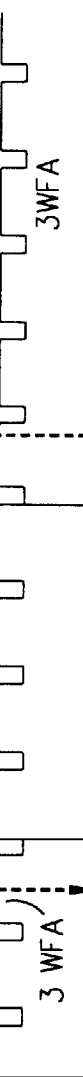
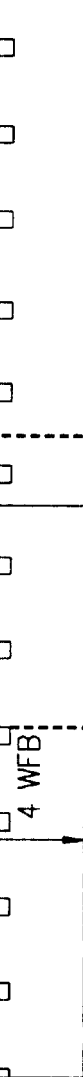
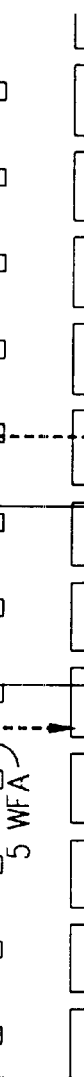
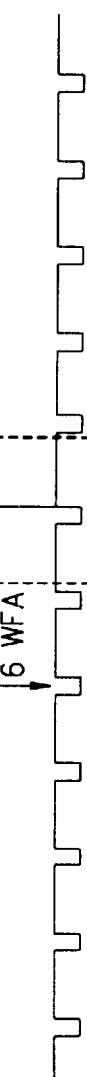
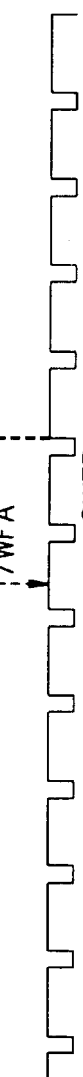
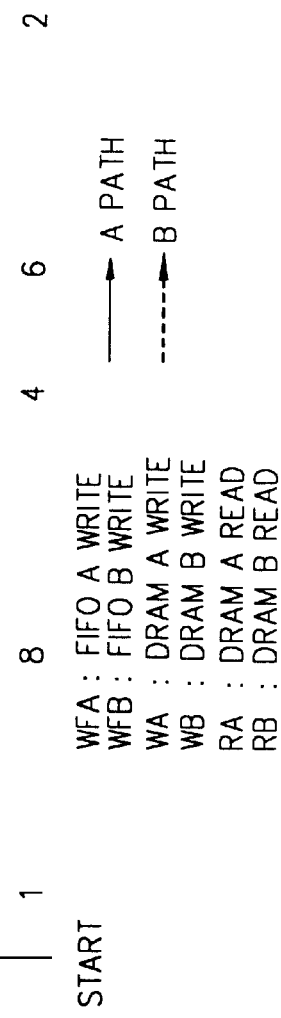
FIG. 4A SOURCE 1
FIG. 4B SOURCE 2
FIG. 4C SOURCE 3
FIG. 4D SOURCE 4
FIG. 4E SOURCE 5
FIG. 4F SOURCE 6
FIG. 4G SOURCE 7
FIG. 4H SOURCE 8

IMAGE FRAME SYNCHRONIZING APPARATUS AND METHOD THEREOF

BACKGROUND OF THE INVENTION

1. Field of the Invention

The present invention relates to an image processing system, and in particular to an image frame synchronizing apparatus which receives images from a plurality of image sources and synchronizes image frames outputted from the plurality of image sources with an image frame outputted from one image source among the image sources, in order to display the images on a cathode ray tube (CRT) in one frame unit, and a method thereof.

2. Description of the Background Art

In general, in an image processing system which receives images from a plurality of sources at the same time, and displays one image frame among the images on a single cathode ray tube (CRT) or displays two or more image frames thereon at the same time by dividing the CRT screen, the image frames must be synchronized in order to display the image frame or image frames on the CRT whenever a user requires to view the image frame(s) of a specific image source. Here, an image frame synchronizing apparatus is used for synchronizing the image frames.

The image frame synchronizing apparatus has been recently employed in image processing systems such as a closed circuit television (CCTV) system. The conventional image frame synchronizing apparatus composing the CCTV with a screen division apparatus serves to receive images from a plurality of CCTV cameras and synchronize the image frames. The CCTV screen is divided into a certain number of regions, and different image frames are displayed on the divided regions at the same time.

The conventional image frame synchronizing apparatus will now be described in detail.

FIG. 1 illustrates an image frame synchronizing apparatus including: a plurality of A/D converters 10A, 10B, ..., 10H receiving analog image from first to eighth sources SOURCE 1, SOURCE 2 ..., SOURCE 8 and outputting corresponding digital signals, respectively; a synchronous signal detector 20 receiving the analog image signal from the first image source SOURCE 1 and detecting a synchronous signal therefrom; first to eighth decoders 30A, 30B, ... 30H receiving the digital signals from the corresponding plurality of A/D converters 10A, 10B, ..., 10H and outputting corresponding decoding signals, respectively; a video RAM module 40 with a plurality of frame memories respectively storing the decoding signals in one frame units according to the synchronous signal; and a D/A converter 50 converting digital image data into an analog image signal, the digital data being stored in the frame memory in one frame units and outputted from the video RAM module 40.

In the conventional image frame synchronizing apparatus, a reproducing signal can be inputted along with the signals from the plurality of sources. As shown in FIG. 1, the image frame synchronizing apparatus further includes a multiplexer 60 receiving an image signal from the eighth source SOURCE 8 and the reproducing signal, selecting the image or reproducing signal, and outputting the selected one to the eighth A/D converter 10H.

The above-described image frame synchronizing apparatus must be provided with as many signal paths as the sources in order to respectively receive the images from the plurality of sources and output the images as the image frames on the CRT. As a result, there is a disadvantage in that the image frame synchronizing apparatus is increased in size because the hardware corresponding to each path is used in proportion to the number of the sources outputting the image signals. There is another disadvantage of the image frame synchronizing apparatus in that it is expensive because the number of the high-priced video RAMs for respectively storing the signals processed via the paths is increased in proportion to the number of the sources or paths.

SUMMARY OF THE INVENTION

It is therefore a primary object of the present invention to provide an image frame synchronizing apparatus with two paths which receives image signals from a plurality of image signal sources and synchronizes image frames from the image signal sources with an image frame from one image signal source among the plurality of image signal sources in order to display the images on a cathode ray tube CRT in one frame unit.

It is another object of the present invention to provide an image frame synchronizing method which receives image signals from a plurality of image signal sources and synchronizes image frames from the image signal sources with an image frame from one image signal source among the plurality of image signal sources in order to display the images on a cathode ray tube CRT in one frame unit.

In order to achieve the primary object of the present invention, there is provided an image frame synchronizing apparatus including; a switch receiving and switching source image signals outputted from a plurality of image signal sources in order to output the image signals to a first output terminal and a second output terminal; a frame synchronous signal detector detecting a synchronous signal from the image signal one of the image signal source among the plurality of image signal sources; first and second A/D converters converting analog image signals to digital image signals, the analog image signals being outputted respectively from the first and second output terminals; first and second decoders decoding the digital image signals and respectively outputting first and second decoding signals; first and second buffers storing the first and second decoding signals according to the frame synchronous signal, the buffers being identical in size to an image frame; a video RAM module with two RAMs which respectively store the first and second decoding signals outputted from the first and second buffers; and a D/A converter converting an output signal from the video RAM module into an analog image signal, and outputting the converted signal to a cathode ray tube (CRT).

In order to achieve another object of the present invention, there is also provided an image frame synchronizing method including the steps of: a switching step of separately outputting image signals from a plurality of image signal sources to a first path and a second path; a synchronous signal detecting step of receiving an image signal from one of the image signal source among the plurality of image sources and detecting a frame synchronous signal therefrom; a first processing step of generating and storing a first decoding signal by respectively decoding a frame image of the image signals inputted to the first path, and outputting the first decoding signal according to the synchronous signal; a second processing step of generating and storing a second decoding signal by respectively decoding a frame image of the image signals inputted to the second path, and outputting the second decoding signal according to the frame synchronous signal; a third processing step of alternately storing the first and second decoding signals outputted in the first or second processing steps, and alternately outputting the thusly stored signals; and a converting step of converting the signals outputted in the third processing step into signals which can be displayed on a cathode ray tube (CRT).

BRIEF DESCRIPTION OF THE DRAWINGS

The present invention will become better understood with reference to the accompanying drawings which are given only by way of illustration and thus are not limitative of the present invention, wherein:

FIGS. 3A to 3H are timing diagrams illustrating image frames outputted from first to eighth image signal sources, especially a process for generating an image frame in a random switching mode by the image frame synchronizing apparatus according to the present invention; and FIGS. 4A to 4H are timing diagrams illustrating the image frames outputted from the first to eighth image signal sources, especially a process for generating an image frame in an automatic switching mode by the image frame synchronizing apparatus according to the present invention.

DETAILED DESCRIPTION OF THE INVENTION

Figure 1:
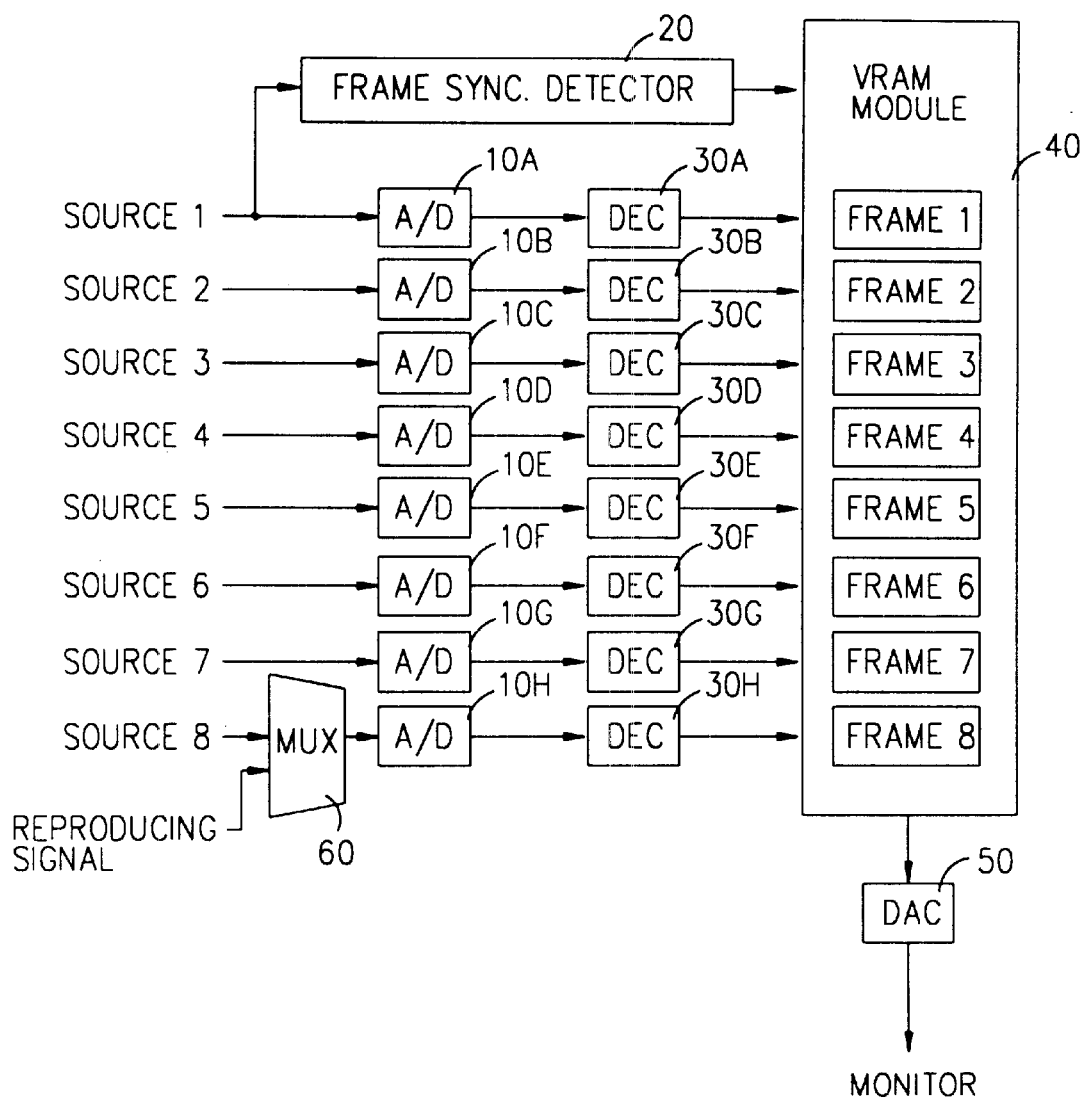
FIG. 1 is a schematic block diagram illustrating a conventional image frame synchronizing apparatus.
Figure 2:
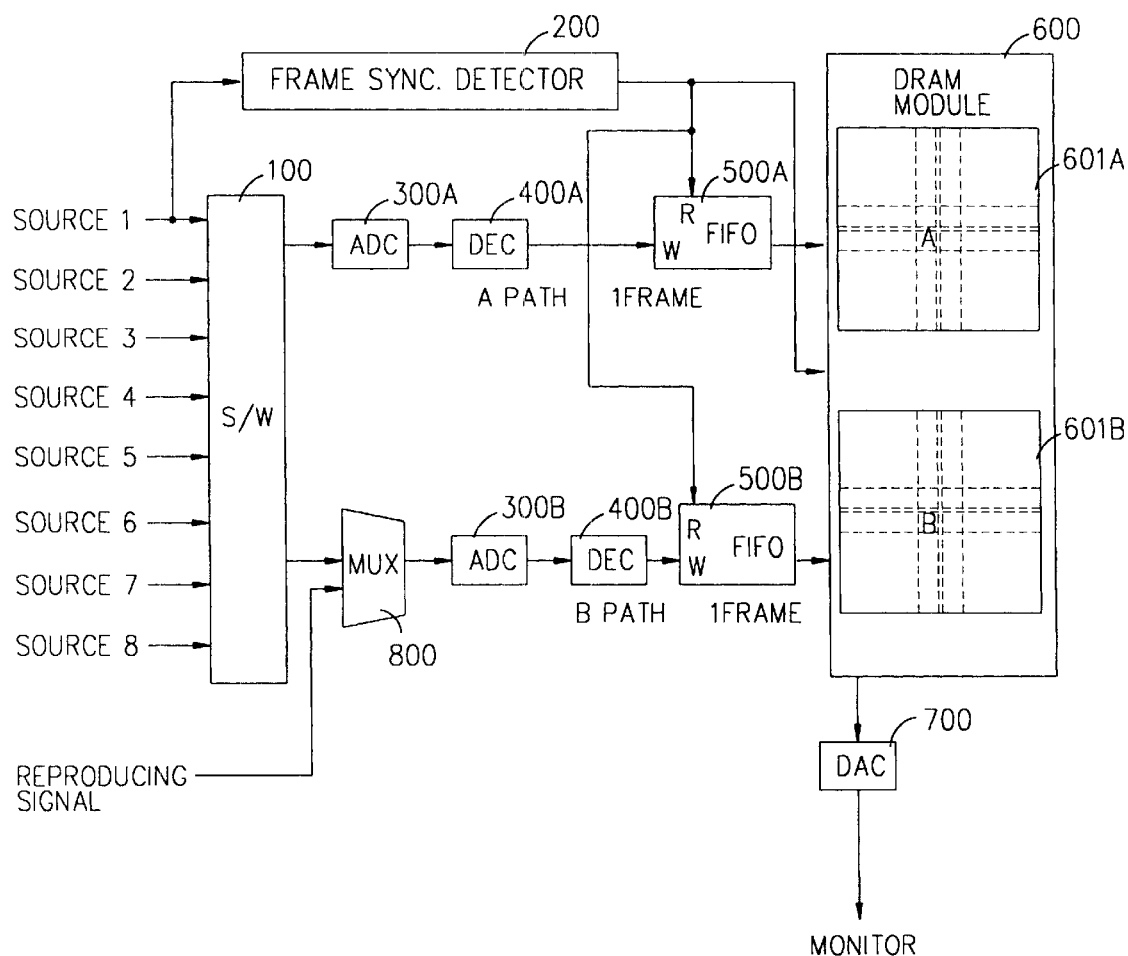
FIG. 2 is a schematic block diagram illustrating an image frame synchronizing apparatus according to the present invention.

FIG. 2 is a schematic block diagram illustrating an image frame synchronizing apparatus according to the present invention, including: a switch 100 receiving and switching source image signals outputted from a plurality of image signal sources SOURCE 1, SOURCE 2, . . . , SOURCE 8 in order to output the image signals to a first output terminal and a second output terminal; a synchronous signal detector 200 detecting a frame synchronous signal from the image signal of the first image signal source SOURCE 1; first and second A/D converters 300A, 300B converting the analog image signals being outputted respectively from the first and second output terminals into digital signals; first and second decoders 400A, 400B respectively decoding the digital signals from the first and second A/D converters 300A, 300B and outputting first and second decoding signals; first and second buffers 500A, 500B storing the first and second decoding signals in accordance with the frame synchronous signal, the buffers being identical in size to a frame; a video RAM module 600 with a first DRAM 601A and a second DRAM 601B which respectively store the first and second decoding signals outputted from the first and second buffers 500A, 500B; and a D/A converter 700 converting an output signal from the video RAM module 600 into an analog signal, and outputting the converted signal to a cathode ray tube (CRT).

In the image frame synchronizing apparatus, a reproducing signal can be inputted along with the plurality of image source signals. As depicted in FIG. 2, the image frame synchronizing apparatus may further includes a multiplexer 800 receiving the image source signal from the second output terminal and the reproducing signal, selecting either the image source signal or the reproducing signal, and outputting the selected one to the second A/D converter 300B.

The operation of the image frame synchronizing apparatus according to a first embodiment of the present invention will now be described with reference to the accompanying drawings.

FIGS. 3A to 3H are timing diagrams illustrating the image source signals outputted from the first to eighth image signal sources SOURCE 1, SOURCE 2, . . . , SOURCE 8, especially the image frames outputted in a random switching mode from the image frame synchronizing apparatus according to the present invention when the image frames from the image signal sources are synchronized with the image frame from the first image signal source by the image frame synchronous apparatus.

As illustrated in FIGS. 3A to 3H, 'A' and 'B' indicate paths for processing signals outputted from the first output terminal of the switch 100. 'WFA' and 'WFB' indicate frames stored in the buffers 500A, 500B on the paths A and B. 'WA' and 'WB' indicate frames stored in the DRAMs 601A, 601B of the video RAM module 600. 'RA' and 'RB' indicate frames outputted from the DRAMs 601A, 601B of the video RAM module 600.

In addition, a solid arrow indicates that an output signal of the switch 100 is outputted alternately to path A and path B by a switching operation of the switch 100. A broken line arrow indicates that the output signal or the switch 100 is outputted alternately to path B and path A. Numbers before WA, WB, WFA, WFB, RA and RB indicate the respective image frames outputted from the first to eighth image signal sources SOURCE 1, SOURCE 2, . . . , SOURCE 8.

FIG. 3A is a timing diagram illustrating the image frame from the first image signal source SOURCE 1, which is inputted to the frame synchronous signal detector 200 and used to detect the frame synchronous signal. The frame synchronous signal detected by the frame synchronous signal detector 200 is employed to synchronize the image frames from the other image signal sources.

The image frames from the image signal sources SOURCE 1, SOURCE 2, . . . , SOURCE 8 shown in FIGS. 3B to 3H are synchronized with the image frame from the first image signal source illustrated in FIG. 3A. Thus, the output signals from the output terminals pass through path A and path B connected to each output terminal in the random switching mode.

As illustrated in FIG. 3A, when the image signal from the first image signal source SOURCE 1 is outputted to the first output terminal, and thus the image frames thereof are set to pass through path A, a frame 1WA is stored in the first RAM 601A of the video RAM module 600 in accordance with a first frame synchronous signal generated from the image signal of the first image signal source, SOURCE 1.

In accordance with a second frame synchronous signal, the frame 1WA stored in the first RAM 601A is outputted as a frame 1RA, and at the same time a next image frame from the first image signal source on path A is stored as a frame 1WB in the second RAM 601B of the video RAM module 600. Here, the switch 100 is switched to the second output terminal in order for the image signal from the eighth image source to pass through path B. As illustrated in FIG. 3H, the frames from the eighth image signal source pass through path B and are stored in the second buffer 500B.

Pursuant to a third frame synchronous signal, the frame 1WB stored in the second RAM is outputted as a frame 1RB, and at the same time the next frame 1WA from the first signal image source is stored in the first RAM 601A. Also the frame from the eighth image signal source is stored as a frame 8WFB in the second buffer 500B.

In accordance with a fourth frame synchronous signal, the frame 1WA stored in the first RAM 601A is outputted as a frame 1RA. At the same time, the frame 8WFB stored in the second buffer 500B is stored as 8WB frame in the second RAM 601B. The next frame from the eighth image signal source is stored as a frame 8WFB in the second buffer 500B.

The image frame synchronizing apparatus of the present invention is operated in the same manner in accordance with a fifth synchronous signal.

In accordance with a sixth frame synchronous signal, the frame 8RA is outputted from the first RAM 601A, and the frame 8WFB stored in the second buffer 500B is stored in the second RAM 601B. In addition, a next frame 8FWB is stored in the second buffer 500B. As illustrated in FIG. 3D, the switch 100 is switched to output the image signal from the fourth image signal source SOURCE 4 to the first output terminal.

Pursuant to a seventh synchronous signal, the frame 8WB stored in the second RAM 601 B is outputted, and the frame 8WFA stored in the second buffer is stored as a frame 8WA in the first RAM 601A. The image signal frame 4WFA from the fourth image signal source is stored in the first buffer 500A. As shown in FIG. 3F, the switch 100 is re-switched, thereby outputting the image signal from the sixth image signal source to path B.

In Accordance with an eighth frame synchronous signal, the frame 8WA stored in the first RAM 601A is outputted as frame 8RA. The frame 4WFA stored in the first buffer 500A is stored in the second RAM 601B as frame 4WB. Also, frame 6WFB is stored in the second buffer 500B. As discussed earlier, the image frame synchronizing apparatus of the present invention receives the image signals from the first to eighth image signal sources, and in the random switching mode, stores and outputs the output signals from the output terminals passing through path A or B in one frame unit.

FIGS. 4A to 4H are timing diagrams illustrating the image frames outputted from the first to eighth image signal sources SOURCE 1, SOURCE 2, ... SOURCE 8, especially the image frames outputted in an automatic switching mode from the image frame synchronizing apparatus in accordance with the present invention when the image signal frames from the image signal sources are synchronized with the image signal frame from the first image source by the image frame synchronizing apparatus. Here, the reference numerals in FIGS. 4A to 4H are identical to those in FIGS. 3A to 3H.

As illustrated in FIGS. 4A to 4H, when the switch 100 sequentially switches the first to eight image signal sources, the image frames from the first to eighth image signal sources are sequentially outputted to path A and path B. The image frame synchronizing apparatus of the present invention inputs and stores the frames passing through path A (1WFA, 3WFA, 5WFA, 7WFA, 1WFA, ... ) and the frames passing through path B 2WFB, 4WFB, 6WFB, 8WFB, 2WFB, ... ), and outputs the frames as frames 1RA, 2RB, 3RA, 4RB, 5RA, 6RB, 7RA, 8RB, 1RA, etc., in accordance with the frame synchronous signals that are detected by the frame synchronous signal detector 200.

In accordance with the first embodiment of the present invention, the switch 100 uses a signal generated from a signal generator (not shown). In addition, a special signal may be used as the synchronous signal, instead of the synchronous signals detected from the image signals of the eight image sources.

In accordance with the second embodiment of the present invention, the image frame synchronizing method includes: a switching step of separately outputting image from a plurality of image signal sources to a first path and a second path; a synchronous signal detecting step of receiving the image of the image signal source among the plurality of image signal sources and detecting a frame synchronous signal therefrom; a first processing step of generating and storing a first decoding signal by respectively decoding a frame image of the image signals inputted to the first path, and outputting the first decoding signal according to the frame synchronous signal; a second processing step of generating and storing a second decoding signal by respectively decoding a frame image of the images inputted to the second path, and outputting the second decoding signal according to the synchronous signal; a third processing step of alternately storing the first and second decoding signals outputted in the first or second process step, and alternately outputting the stored signals; and a converting step of converting the signals outputted in the third processing step into signals which can be displayed on a cathode ray tube (CRT).

As a result, the image frame synchronizing apparatus of the present invention receives the image signals from the eight image signal sources, respectively, divides the image frames into two paths, and stores and outputs the image frames, thereby reducing the hardware size thereof.

Eight image signal sources are exemplified in the first and second embodiments of the present invention. It will be recognized by those skilled in this art that the number of the image signal sources accomodated can be easily changed by modifying the embodiments of the present invention.

As the present invention may be embodied in several forms without departing from the spirit of essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. An image frame synchronizing apparatus comprising:

a switching unit for receiving and switching source image signals from a plurality of image signal sources in order to output the image signal to a first output terminal and a second output terminal randomly in a random switching mode and sequentially in an automatic switching mode;

a frame synchronous signal detector for receiving the image signal from one image signal source among the plurality of image signal sources, and detecting a frame synchronous signal therefrom;

a first processing unit for storing a first decoding signal by decoding an output signal from the switching unit and outputting the first decoding signal in accordance with the frame synchronous signal;

a second processing unit for storing a second decoding signal by decoding an output signal from the switching unit and outputting the second decoding signal in accordance with the frame synchronous signal;

a storing unit with a plurality of memories for receiving and alternately storing the first decoding signal and/or second decoding signal in the plurality of memories in accordance with the frame signal, and for alternately outputting the first decoding signal and/or second decoding signal stored in the plurality of memories in accordance with the frame signal; and a D/A converter for converting the decoding signal outputted from the storing unit into an analog signal.

2. The apparatus of claim 1, wherein the one image signal source is a first image signal source.

3. The apparatus of claim 1, wherein the first processing unit comprises:
- a first A/D converter for receiving the output signal from the first output terminal of the switching unit and converting the signal into a digital signal;
- a first decoder for decoding the digital signal from the first A/D converter and outputting the first decoding signal; and
- a first buffer for receiving and storing the first decoding signal, and outputting the first decoding signal in accordance with the frame synchronous signal.

4. The apparatus of claim 3, wherein the first buffer is a memory with a FIFO (First In First Out) function for storing one frame image.

5. The apparatus of claim 1, wherein the plurality of memories are two DRAMs for each respectively storing one frame image.

6. The apparatus of claim 1, further comprising a multiplexer for receiving the output signal from the first output terminal or second output terminal, the image signals from the plurality of image sources and a reproducing signal outputted from a reproducing signal source, and for selecting and outputting the output signal from the output terminals or the reproducing signal.

7. The apparatus of claim 7, wherein the multiplexer receives the output signal from the second output terminal and the reproducing signal.

8. An image frame synchronizing method comprising:
- a switching step for outputting image signals from a plurality of image signal sources to a first path and a second path randomly in a random switching mode and sequentially in an automatic switching mode;
- a frame synchronous signal detecting step for receiving the image signal from one image source among the plurality of image signal sources and detecting a frame synchronous signal therefrom;
- a first processing step for generating and storing a first decoding signal by respectively decoding a frame image of the image signals inputted to the first path, and outputting the first decoding signal in accordance with the frame synchronous signal;
- a second processing step for generating and storing a second decoding signal by respectively decoding a frame image of the image signals inputted to the second path, and outputting the second decoding signal in accordance with the frame synchronous signal;
- a third processing step for alternately storing the first and second decoding signals outputted in the first or second processing steps, and alternately outputting the stored signals in accordance with the frame signal; and
- a converting step for converting the signals outputted in the third processing step into signals which can be displayed on a cathode ray tube (CRT).

* * * * *